US010431249B2

(12) United States Patent
Kasada et al.

(10) Patent No.: US 10,431,249 B2
(45) Date of Patent: *Oct. 1, 2019

(54) MAGNETIC TAPE HAVING CHARACTERIZED MAGNETIC LAYER AND MAGNETIC TAPE DEVICE

(71) Applicant: FUJIFILM Corporation, Tokyo (JP)

(72) Inventors: Norihito Kasada, Minami-ashigara (JP); Tetsuya Kaneko, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,464

(22) Filed: Jun. 13, 2017

(65) Prior Publication Data

US 2017/0372726 A1  Dec. 28, 2017

(30) Foreign Application Priority Data

Jun. 23, 2016 (JP) ................. 2016-124515

(51) Int. Cl.
*G11B 5/71* (2006.01)
*G11B 5/008* (2006.01)
*G11B 5/596* (2006.01)
*G11B 5/712* (2006.01)

(52) U.S. Cl.
CPC ............ *G11B 5/71* (2013.01); *G11B 5/00813* (2013.01); *G11B 5/59633* (2013.01); *G11B 5/59688* (2013.01); *G11B 5/712* (2013.01)

(58) Field of Classification Search
None
See application file for complete search history.

(56) References Cited

U.S. PATENT DOCUMENTS

| | | | |
|---|---|---|---|
| 3,966,686 | A | 6/1976 | Asakura et al. |
| 4,112,187 | A | 9/1978 | Asakura et al. |
| 4,425,404 | A | 1/1984 | Suzuki et al. |
| 4,693,930 | A | 9/1987 | Kuo et al. |
| 4,746,569 | A | 5/1988 | Takahashi et al. |
| 4,825,317 | A | 4/1989 | Rausch |
| 5,242,752 | A | 9/1993 | Isobe et al. |
| 5,419,938 | A | 5/1995 | Kagotani et al. |
| 5,445,881 | A | 8/1995 | Irie |
| 5,474,814 | A | 12/1995 | Komatsu et al. |
| 5,496,607 | A | 3/1996 | Inaba et al. |
| 5,540,957 | A | 7/1996 | Ueda et al. |
| 5,585,032 | A | 12/1996 | Nakata et al. |
| 5,645,917 | A | 7/1997 | Ejiri et al. |
| 5,689,384 | A | 11/1997 | Albrecht et al. |
| 5,728,454 | A | 3/1998 | Inaba et al. |
| 5,786,074 | A | 7/1998 | Soui |
| 5,827,600 | A | 10/1998 | Ejiri et al. |
| 6,099,957 | A | 8/2000 | Yamamoto et al. |
| 6,183,606 | B1 | 2/2001 | Kuo et al. |
| 6,207,252 | B1 * | 3/2001 | Shimomura .............. G11B 5/70 428/141 |
| 6,228,461 | B1 | 5/2001 | Sueki et al. |
| 6,254,964 | B1 | 7/2001 | Saito et al. |
| 6,261,647 | B1 | 7/2001 | Komatsu et al. |
| 6,268,043 | B1 | 7/2001 | Koizumi et al. |
| 6,496,328 | B1 | 12/2002 | Dugas |
| 6,579,826 | B2 | 6/2003 | Furuya et al. |
| 6,649,256 | B1 | 11/2003 | Buczek et al. |
| 6,686,022 | B2 | 2/2004 | Takano et al. |
| 6,770,359 | B2 | 8/2004 | Masaki |
| 6,791,803 | B2 | 9/2004 | Saito et al. |
| 6,835,461 | B1 | 12/2004 | Yamagata et al. |
| 6,921,592 | B2 | 7/2005 | Tani et al. |
| 6,939,606 | B2 | 9/2005 | Hashimoto et al. |
| 6,950,269 | B1 | 9/2005 | Johnson |
| 6,994,925 | B2 | 2/2006 | Masaki |
| 7,014,927 | B2 | 3/2006 | Sueki et al. |
| 7,029,726 | B1 | 4/2006 | Chen et al. |
| 7,153,366 | B1 | 12/2006 | Chen et al. |

(Continued)

FOREIGN PATENT DOCUMENTS

| | | |
|---|---|---|
| DE | 101 46 429 A1 | 3/2002 |
| GB | 2495356 A | 4/2013 |

(Continued)

OTHER PUBLICATIONS

Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.

(Continued)

*Primary Examiner* — Kevin M Bernatz
(74) *Attorney, Agent, or Firm* — Sughrue Mion, PLLC

(57) ABSTRACT

A magnetic tape includes a magnetic layer having ferromagnetic powder and a binder on a non-magnetic support. The total thickness of the magnetic tape is less than equal to 5.30 μm. The magnetic layer includes a timing-based servo pattern. The center line average surface roughness Ra measured regarding the surface of the magnetic layer is less than or equal to 1.8 nm. One or more components selected from a fatty acid and a fatty acid amide are included in the magnetic layer, and the C—H derived C concentration calculated from the C—H peak area ratio of C1s spectra obtained by X-ray photoelectron spectroscopic analysis performed on the surface of the magnetic layer at a photoelectron take-off angle of 10 degrees is greater than or equal to 45 atom %.

16 Claims, 2 Drawing Sheets

(56) References Cited

U.S. PATENT DOCUMENTS

| | | | |
|---|---|---|---|
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2* | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2* | 7/2017 | Kasada | G11B 5/71 |
| 9,721,605 B2* | 8/2017 | Oyanagi | G11B 5/71 |
| 9,721,606 B2* | 8/2017 | Kasada | G11B 5/8404 |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2* | 12/2017 | Ozawa | G11B 5/00813 |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2* | 5/2018 | Kasada | G11B 5/68 |
| 9,984,712 B1 | 5/2018 | Ozawa et al. | |
| 9,984,716 B1* | 5/2018 | Kaneko | G11B 5/70 |
| 10,008,230 B1 | 6/2018 | Ozawa et al. | |
| 10,026,430 B2 | 7/2018 | Kasada et al. | |
| 10,026,433 B2 | 7/2018 | Kasada | |
| 10,026,434 B2* | 7/2018 | Oyanagi | G11B 5/70 |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2* | 11/2018 | Kasada | G11B 5/70 |
| 10,170,144 B2 | 1/2019 | Ozawa et al. | |
| 2001/0038928 A1* | 11/2001 | Nakamigawa | G11B 5/70 428/832.2 |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1* | 9/2003 | Inoue | G11B 5/735 428/845.4 |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1* | 2/2006 | Kuse | G11B 5/708 428/844 |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1* | 1/2011 | Kaneko | C08G 73/0206 430/7 |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1* | 2/2012 | Tanaka | G11B 5/71 428/840.2 |
| 2012/0177951 A1 | 7/2012 | Yamazaki et al. | |
| 2012/0183811 A1 | 7/2012 | Hattori et al. | |
| 2012/0196156 A1* | 8/2012 | Suzuki | G11B 5/70 428/844 |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2013/0029183 A1 | 1/2013 | Omura | |
| 2013/0084470 A1 | 4/2013 | Hattori et al. | |
| 2013/0088794 A1 | 4/2013 | Cherubini et al. | |
| 2013/0256584 A1* | 10/2013 | Yamazaki | H01F 1/01 252/62.58 |
| 2013/0260179 A1 | 10/2013 | Kasada et al. | |
| 2013/0279040 A1* | 10/2013 | Cideciyan | H03M 13/13 360/53 |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 | 9/2014 | Kasada | |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |
| 2016/0092315 A1* | 3/2016 | Ashida | G06F 11/1469 707/684 |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |

(56) References Cited

U.S. PATENT DOCUMENTS

| | | |
|---|---|---|
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1* | 6/2017 | Kasada ............. G11B 5/70626 |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi ................. G11B 5/70 |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1* | 12/2017 | Kasada ............. G11B 5/00813 |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1* | 12/2017 | Kasada ............. G11B 5/00813 |
| 2017/0372739 A1* | 12/2017 | Ozawa ................... G11B 5/71 |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1* | 12/2017 | Kasada .................. G11B 5/584 |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182429 A1* | 6/2018 | Kasada .................... G11B 5/78 |
| 2018/0182430 A1 | 6/2018 | Ozawa et al. |
| 2018/0182428 A1 | 7/2018 | Kasada et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1* | 10/2018 | Kasada ................... G11B 5/70 |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1* | 1/2019 | Tada ................. G11B 5/00813 |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1* | 3/2019 | Kasada .................. G11B 5/714 |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1* | 4/2019 | Ozawa .................. G11B 5/712 |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-139923 A | 6/1986 |
| JP | 61139932 A * | 6/1986 |
| JP | 63-129519 A | 6/1988 |
| JP | 63-249932 A | 10/1988 |
| JP | 61-11924 A | 1/1989 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-38579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-049731 A | 3/2010 |
| JP | 2011-048878 A | 3/2011 |
| JP | 2011-138566 A | 7/2011 |
| JP | 2011-210288 A | 10/2011 |
| JP | 2011-225417 A | 11/2011 |
| JP | 2012-038367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-051493 A | 4/2016 |

(56) References Cited

FOREIGN PATENT DOCUMENTS

| | | |
|---|---|---|
| JP | 2016-71926 A | 5/2016 |
| JP | 2016-139451 A | 8/2016 |

OTHER PUBLICATIONS

Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 25, 2018 in Japanese Application No. 2015-254192.
Office Action dated Dec. 25, 2018 in Japanese Application No. 2015-245144.
Office Action dated Dec. 25, 2018 in Japanese Application No. 2015-245145.
Office Action dated Dec. 31, 2018 in U.S. Appl. No. 16/009,603.
U.S. Appl. No. 15/280,195, Eiki Ozawa, filed Sep. 29, 2016.
U.S. Appl. No. 15/422,821, Masahito Oyanagi, filed Feb. 2, 2017.
U.S. Appl. No. 15/422,944, Eiki Ozawa, filed Feb. 2, 2017.
U.S. Appl. No. 15/619,012, Masahito Oyanagi, filed Jun. 9, 2017.
U.S. Appl. No. 15/624,897, Eiki Ozawa, filed Jun. 16, 2018.
U.S. Appl. No. 15/626,832, Eiki Ozawa, filed Jun. 19, 2017.
U.S. Appl. No. 15/625,428, Takuto Kurokawa, filed Jun. 16, 2017.
U.S. Appl. No. 15/380,336, Norihito Kasada, filed Dec. 15, 2016.
U.S. Appl. No. 15/614,876, Norihito Kasada, filed Jun. 6, 2017.
U.S. Appl. No. 15/620,916, Norihito Kasada, filed Jun. 13, 2017.
U.S. Appl. No. 15/854,439, Eiki Ozawa, filed Dec. 26, 2017.
U.S. Appl. No. 15/626,720, Norihito Kasada, filed Jun. 19, 2017.
U.S. Appl. No. 15/854,383, Norihito Kasada, filed Dec. 26, 2017.
U.S. Appl. No. 15/624,792, Eiki Ozawa, filed Jun. 16, 2017.
U.S. Appl. No. 15/422,944, Allowed; RCE filed Nov. 21, 2018.
U.S. Appl. No. 15/625,428, Pending.
U.S. Appl. No. 15/614,876, Pending (the present application).
U.S. Appl. No. 15/621,464, Pending.
U.S. Appl. No. 15/626,720, Pending.
U.S. Appl. No. 15/848,173, Pending.
Notice of Allowance, dated Dec. 2, 2016, issued by the U.S. Patent and Trademark Office in U.S. Appl. No. 14/753,227.
Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Jun. 7, 2018 from U.S. Patent & Trademark Office in U.S. Appl. No. 15/380,309.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
U.S. Appl. No. 15/920,768, QPIDS filed Dec. 10, 2018.
U.S. Appl. No. 16/009,603, Pending.
Notice of Allowance dated Aug. 28, 2018, which issued during the prosecution of U.S. Appl. No. 15/422,821.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.

(56) References Cited

OTHER PUBLICATIONS

Office Action dated Jul. 6, 2018, which issued during the prosecution of U.S. Appl. No. 15/848,173.
Office Action dated Oct. 3, 2018, which issued during the prosecution of U.S. Appl. No. 15/280,195.
Office Action dated Oct. 15, 2018, which issued during the prosecution of U.S. Appl. No. 15/619,012.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Sep. 27, 2018, which issued during the prosecution of U.S. Appl. No. 15/854,383.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Communication dated May 7, 2018 from the U.S. Patent and Trademark Office in U.S. Appl. No. 15/626,832.
Communication dated May 7, 2018 from the U.S. Patent and Trademark Office in U.S. Appl. No. 15/624,897.
Communication dated May 7, 2018 from the U.S. Patent and Trademark Office in U.S. Appl. No. 15/624,792.
Communication dated May 4, 2018 from the U.S. Patent and Trademark Office in U.S. Appl. No. 15/422,821.
Communication dated May 4, 2018 from the U.S. Patent and Trademark Office in U.S. Appl. No. 15/625,428.
Communication dated May 4, 2018 from the U.S. Patent and Trademark Office in U.S. Appl. No. 15/422,944.
Communication dated May 2, 2018 from the U.S. Patent and Trademark Office in U.S. Appl. No. 15/280,195.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Notice of Allowance dated Aug. 30, 2017, which issued during the prosecution of U.S. Appl. No. 15/466,143.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Aug. 28, 2018, which issued during the prosecution of U.S. Appl. No. 14/522,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/626,720.
An Office Action dated Nov. 29, 2018, which issued during the prosecution of U.S. Appl. No. 15/380,309.
An Office Action dated Nov. 29, 2018, which issued during the prosecution of U.S. Appl. No. 15/422,821.
U.S. Appl. No. 15/625,428, Allowed Dec. 4, 2018.
U.S. Appl. No. 15/854,438, Allowed, Issue Fee not yet paid.
U.S. Appl. No. 15/854,409, Pending.
U.S. Appl. No. 15/920,563, RCE and Petition to Withdraw from Issue filed Dec. 17, 2018.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Pending.
U.S. Appl. No. 15/422,944, Allowed.
U.S. Appl. No. 15/466,143, Patented as U.S. Pat. No. 9,837,116.
U.S. Appl. No. 15/619,012, Pending.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Allowed; RCE filed Nov. 21, 2018.
U.S. Appl. No. 15/614,876, Pending.
U.S. Appl. No. 15/620,916, Pending.
U.S. Appl. No. 15/621,464 (the present Application), Pending.
U.S. Appl. No. 15/626,720, Allowed.
U.S. Appl. No. 15/854,383, Pending.
U.S. Appl. No. 15/854,507, Patented as U.S. Pat. No. 9,984,716.
U.S. Appl. No. 15/854,439, Pending.
U.S. Appl. No. 15/854,506, Patented as U.S. Pat. No. 10,008,230.
U.S. Appl. No. 15/848,173, Allowed.
U.S. Appl. No. 15/628,814, Pending.
U.S. Appl. No. 15/690,400, Pending.
U.S. Appl. No. 15/690,906, Pending.
U.S. Appl. No. 15/626,355, Pending.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Pending.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.

(56) References Cited

OTHER PUBLICATIONS

U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
U.S. Appl. No. 15/920,518, Allowed.
U.S. Appl. No. 15/899,587, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Pending.
U.S. Appl. No. 16/038,669, Pending.
U.S. Appl. No. 15/900,106, Pending.
"Introduction to TMR Magnetic Sensors", Anonymous, Mar. 12, 2015, MR Sensor Technology, pp. 1-5 (Year: 2015).
Notice of Allowance dated Apr. 16, 2019 in U.S. Appl. No. 15/625,428.
Notice of Allowance dated Aug. 27, 2018 in U.S. Appl. No. 15/920,635.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Nov. 19, 2018 in U.S. Appl. No. 15/900,141.
Notice of Allowance dated Apr. 30, 2019 in U.S. Appl. No. 15/380,309.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Apr. 4, 2019 in U.S. Appl. No. 16/184,312.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 15/380,336, Pending.
U.S. Appl. No. 15/628,814, Allowed.
U.S. Appl. No. 15/626,355, Allowed.
U.S. Appl. No. 15/380,309, Allowed.
U.S. Appl. No. 15/920,518, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 16/100,289, Allowed.
U.S. Appl. No. 15/900,412, Patented as U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 16/012,018, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.

(56) References Cited

OTHER PUBLICATIONS

U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Pending.
Notice of Allowance dated Jul. 16, 2019 in U.S. Appl. No. 15/900,144.
Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated May 23, 2019 in U.S. Appl. No. 15/388,911.
Office Action dated Jul. 16, 2019 in Japanese Application No. 2016-124933.

* cited by examiner

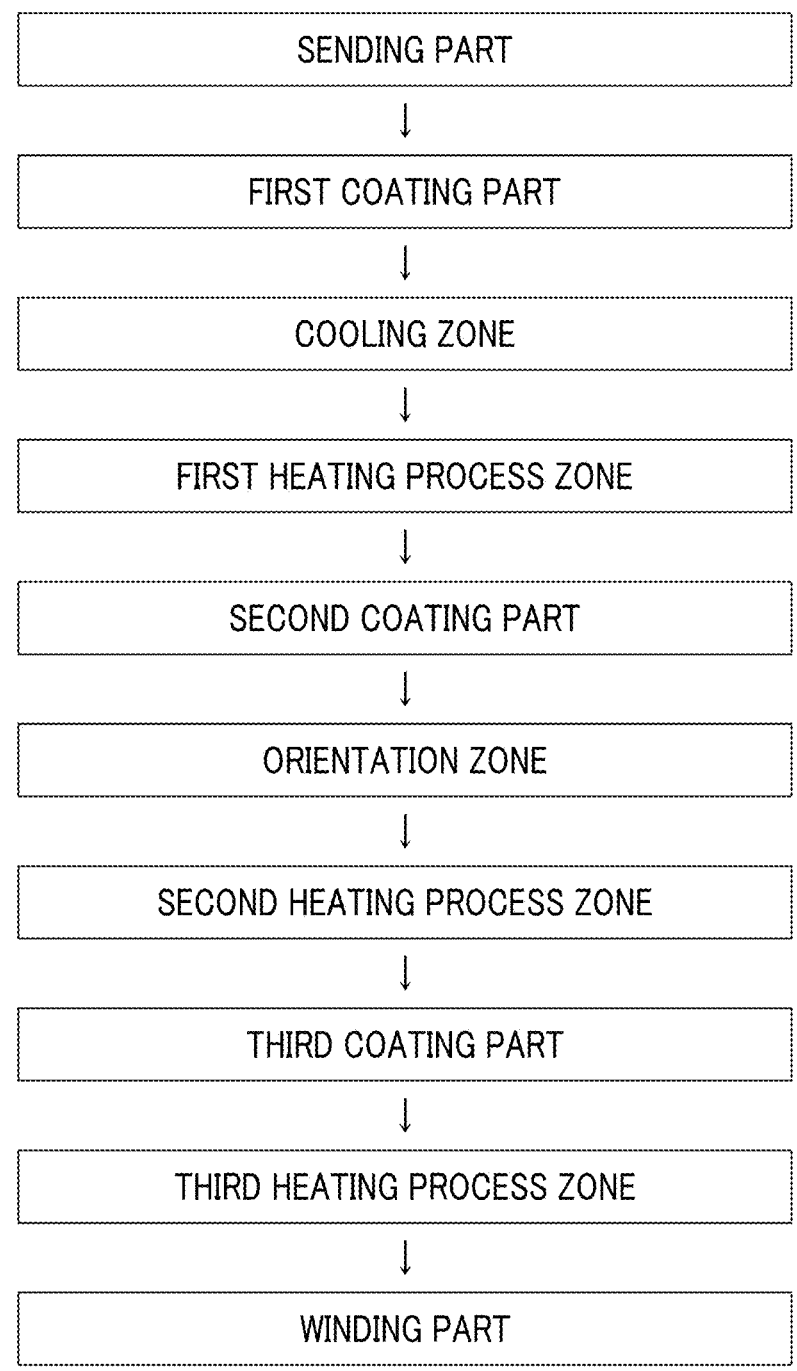

MAGNETIC TAPE HAVING CHARACTERIZED MAGNETIC LAYER AND MAGNETIC TAPE DEVICE

CROSS-REFERENCE TO RELATED APPLICATIONS

This application claims priority under 35 U.S.C 119 to Japanese Patent Application No. 2016-124515 filed on Jun. 23, 2016. The above application is hereby expressly incorporated by reference, in its entirety.

BACKGROUND OF THE INVENTION

1. Field of the Invention

The present invention relates to a magnetic tape and a magnetic tape device.

2. Description of the Related Art

Magnetic recording media are divided into tape-shaped magnetic recording media and disk-shaped magnetic recording media, and tape-shaped magnetic recording media, that is, magnetic tapes (hereinafter, also simply referred to as "tapes") are mainly used for data storage such as data back-up or archive. The recording of information into magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technology of disposing the larger amount of data tracks in a width direction of the magnetic tape by narrowing the width of the data track to increase recording density is used.

However, when the width of the data track is narrowed and the recording and/or reproduction of magnetic signals is performed by allowing the running of the magnetic tape in a magnetic tape device (normally referred to as a "drive"), it is difficult that a magnetic head properly follows the data tracks in accordance with the position change of the magnetic tape in the width direction, and errors may easily occur at the time of recording and/or reproduction. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo signal (servo pattern) is formed in a magnetic layer of a magnetic tape and this servo pattern is magnetically read to perform head tracking. More specific description is as follows.

First, a servo head reads a servo pattern formed in a magnetic layer (that is, a servo signal is reproduced). A position of a magnetic head of the magnetic tape in a width direction is controlled in accordance with a value (details thereof will be described later) obtained by reading the servo pattern. Accordingly, when running the magnetic tape in the magnetic tape device for recording and/or reproducing a magnetic signal (information), it is possible to increase an accuracy of the position of the magnetic head following the data track, even when the position of the magnetic tape is changed in the width direction with respect to the magnetic head. By doing so, it is possible to properly record information on the magnetic tape and/or properly reproduce information recorded on the magnetic tape.

As the magnetic servo type servo system described above, a timing-based servo type is widely used in recent years. In a timing-based servo type servo system (hereinafter, referred to as a "timing-based servo system"), a plurality of servo patterns having two or more different shapes are formed in a magnetic layer, and a position of a servo head is recognized by an interval of time when the servo head has read the two servo patterns having different shapes and an interval of time when the two servo patterns having the same shapes are read. The position of the magnetic head of the magnetic tape in the width direction is controlled based on the position of the servo head recognized as described above.

Meanwhile, a magnetic tape is normally distributed and used in a state of being housed in a magnetic tape cartridge. It is desired that the entire length of the magnetic tape housed in one reel of the magnetic tape cartridge is lengthened to increase recording capacity per one reel of the magnetic tape cartridge. To do so, a total thickness of the magnetic tape is needed to be reduced (hereinafter, referred to as "thinning").

In addition, in recent years, high surface smoothness of the magnetic layer of the magnetic tape has been required. This is because the high surface smoothness of the magnetic layer causes improvement of electromagnetic conversion properties.

With such a point, the inventors have examined a technology of applying a magnetic tape having a thin total thickness and high surface smoothness of the magnetic layer to a timing-based servo system. However, in such research, it was clear that, in a case of a magnetic tape having a thin total thickness and high surface smoothness of the magnetic layer, a phenomenon which was not known in the related art occurred, in which frequency of occurrence of signal defect at the time of servo signal reproducing in the timing-based servo system is increased. As an example of such signal defect, signal defect called thermal asperity is used. The thermal asperity refers to, in a system including a magnetoresistive (MR) head mounting a MR element, a variation in a reproduced waveform caused by a variation in a resistance value of the MR element due to a local temperature change in the MR element. In a case where signal defect occurs at the time of servo signal reproducing, a head tracking in an occurrence place is less likely to be performed. Therefore, in order to further properly record information on the magnetic tape and/or further properly reproduce information recorded on the magnetic tape by using the timing-based servo system, it is required to reduce the frequency of occurrence of signal defect at the time of servo signal reproducing.

Accordingly, an object of the invention is to reduce the frequency of occurrence of signal defect at the time of servo signal reproducing in a timing-based servo system using a magnetic tape having a thin total thickness and high surface smoothness of the magnetic layer.

According to one aspect of the invention, there is provided a magnetic tape comprising: a non-magnetic support; and a magnetic layer including ferromagnetic powder and a binder on the non-magnetic support, in which a total thickness of the magnetic tape is equal to or smaller than 5.30 μm, the magnetic layer includes a timing-based servo pattern, a center line average surface roughness Ra measured regarding a surface of the magnetic layer is equal to or smaller than 1.8 nm, one or more components selected from the group consisting of fatty acid and fatty acid amide are included in the magnetic layer, and a C—H derived C concentration calculated from a C—H peak area ratio of C1s spectra obtained by X-ray photoelectron spectroscopic analysis performed on the surface of the magnetic layer at a photoelectron take-off angle of 10 degrees is equal to or greater than 45 atom %.

The "timing-based servo pattern" of the invention and the specification is a servo pattern with which the head tracking of the timing-based servo system can be performed. The timing-based servo system is as described above. The servo pattern with which the head tracking of the timing-based servo system can be performed, is formed in the magnetic layer by a servo pattern recording head (also referred to as a "servo write head") as a plurality of servo patterns having two or more different shapes. As an example, the plurality of servo patterns having two or more different shapes are continuously disposed at regular intervals for each of the plurality of servo patterns having the same shapes. As another example, different types of the servo patterns are alternately disposed. The same shapes of the servo patterns do not only mean the completely same shape, and a shape error occurring due to a device such as a servo write head or the like is allowed. The shapes of the servo pattern with which the head tracking of the timing-based servo system can be performed and the disposition thereof in the magnetic layer are well known and specific aspect thereof will be described later. Hereinafter, the timing-based servo pattern is also simply referred to as a servo pattern. In the specification, as heads, a "servo write head", a "servo head", and a "magnetic head" are disclosed. The servo write head is a head which performs recording of a servo signal as described above (that is, formation of a servo pattern). The servo head is a head which performs reproduction of the servo signal (that is, reading of the servo pattern), and the magnetic head is a head which performs recording and/or reproduction of information.

In the invention and the specification, the center line average surface roughness Ra (hereinafter, also referred to as a "magnetic layer surface Ra") measured On the surface of the magnetic layer of the magnetic tape is a value measured with an atomic force microscope (AFM) in a region having an area of 40 μm×40 μm. As an example of the measurement conditions, the following measurement conditions can be used. The center line average surface roughness Ra shown in Examples which will be described later is a value obtained by the measurement under the following measurement conditions. In the invention and the specification, the "surface of the magnetic layer" of the magnetic tape is identical to the surface of the magnetic tape on the magnetic layer side.

The measurement is performed regarding the region having an area of 40 μm×40 μm of the surface of the magnetic layer of the magnetic tape with an AFM (Nanoscope 4 manufactured by Veeco Instruments, Inc.). A scan speed (probe movement speed) is set as 40 μm/sec and a resolution is set as 512 pixel×512 pixel.

Meanwhile, the X-ray photoelectron spectroscopic analysis is an analysis method also generally called Electron Spectroscopy for Chemical Analysis (ESCA) or X-ray Photoelectron Spectroscopy (XPS). Hereinafter, the X-ray photoelectron spectroscopic analysis is also referred to as ESCA. The ESCA is an analysis method using a phenomenon of photoelectron emission when a surface of a measurement target sample is irradiated with X ray, and is widely used as an analysis method regarding a surface part of a measurement target sample. According to the ESCA, it is possible to perform qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth ≈ mean free path of electrons×3×sin θ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extremely outermost surface part having a depth of approximately several nm from the sample surface generally becomes an analysis position. Accordingly, in the surface of the magnetic layer of the magnetic tape, according to the analysis performed by the ESCA at a photoelectron take-off angle of 10 degrees, it is possible to perform composition analysis regarding the extremely outermost surface part having a depth of approximately several nm from the surface of the magnetic layer.

The C—H derived C concentration is a percentage of carbon atoms C configuring the C—H bond occupying total (based on atom) 100 atom % of all elements detected by the qualitative analysis performed by the ESCA. The magnetic tape includes one or more components selected from the group consisting of fatty acid and fatty acid amide at least in the magnetic layer. Fatty acid and fatty acid amide are components which can function as lubricants in the magnetic tape. The inventors have considered that, in the surface of the magnetic layer of the magnetic tape including one or more of these components at least in the magnetic layer, the C—H derived C concentration obtained by the analysis performed by the ESCA at a photoelectron take-off angle of 10 degrees becomes an index of the presence amount of the components (one or more components selected from the group consisting of fatty acid and fatty acid amide) in the extremely outermost surface part of the magnetic layer. Specific description is as follows.

In X-ray photoemission spectra (horizontal axis: bonding energy, vertical axis: strength) obtained by the analysis performed by the ESCA., the C1s spectra include information regarding an energy peak of a is orbit of the carbon atoms C. In such C1s spectra, a peak positioned at the vicinity of the bonding energy 284.6 eV is a C—H peak. This C—H peak is a peak derived from the bonding energy of the C—H bond of the organic compound. The inventors have surmised that, in the extremely outermost surface part of the magnetic layer including one or more components selected from the group consisting of fatty acid and fatty acid amide, main constituent components of the C—H peak are components selected from the group consisting of fatty acid and fatty acid amide. Accordingly, the inventors have considered that the C—H derived C concentration can he used as an index of the presence amount as described above.

Hereinafter, the C—H derived C concentration calculated from the peak area ratio of the C1s spectra obtained by the X-ray photoelectron spectroscopic analysis performed at a photoelectron take-off angle of 10 degrees is also referred to as the "surface part C—H derived C concentration".

In one aspect, the surface part C—H derived C concentration is in a range of 45 to 80 atom %.

in one aspect, the surface part C—H derived C concentration is in a range of 50 to 80 atom %.

In one aspect, the magnetic tape further comprises a non-magnetic layer including non-magnetic powder and a binder, between the non-magnetic support and the magnetic layer.

In one aspect, one or more components selected from the group consisting of fatty acid and fatty acid amide are respectively included in the magnetic layer and the non-magnetic layer.

In one aspect, the magnetic layer surface Ra is 1.2 nm to 1.8 nm.

In one aspect, the total thickness of the magnetic tape is 3.00 μm to 5.30 μm.

In one aspect, the magnetic tape further comprises a back coating layer including non-magnetic powder and a binder on a surface of the non-magnetic support opposite to the surface including the magnetic layer.

According to another aspect of the invention, there is provided a magnetic tape device comprising: the magnetic tape described above; a magnetic head; and a servo head.

According to one aspect of the invention, it is possible to provide a magnetic tape which is thinned and has a timing-based servo pattern in a magnetic layer having high surface smoothness and in which a frequency of occurrence of signal defect at the time of servo signal reproducing in a timing-based servo system is reduced, and a magnetic tape device which records and/or reproduces a magnetic signal to the magnetic tape.

BRIEF DESCRIPTION OF THE DRAWINGS

FIG. 3 shows an example (step schematic view) of a specific aspect of a magnetic tape manufacturing step.

DESCRIPTION OF THE PREFERRED EMBODIMENTS

Magnetic Tape

One aspect of the invention relates to a magnetic tape including a magnetic layer including ferromagnetic powder and a binder on a non-magnetic support, in which a total thickness of the magnetic tape is equal to or smaller than 5.30 μm, the magnetic layer includes a timing-based servo pattern, a center line average surface roughness Ra measured regarding a surface of the magnetic layer (magnetic layer surface Ra) is equal to or smaller than 1.8 nm, one or more components selected from the group consisting of fatty acid and fatty acid amide are included in the magnetic layer, and a C—H derived C concentration calculated from a C—H peak area ratio of C1s spectra obtained by X-ray photoelectron spectroscopic analysis performed on the surface of the magnetic layer at a photoelectron take-off angle of 10 degrees (surface part C—H derived C concentration) is equal to or greater than 45 atom %.

Hereinafter, the magnetic tape described above will be described more specifically. The following description contains surmise of the inventors. The invention is not limited by such surmise. In addition, hereinafter, the examples are described with reference to the drawings. However, the invention is not limited to such exemplified aspects.

Timing-Based Servo Pattern

The magnetic tape includes a timing-based servo pattern in the magnetic layer. The timing-based servo pattern is the servo pattern described above. In a magnetic tape used in a linear recording system which is widely used as a recording system of the magnetic tape device, for example, a plurality of regions (referred to as "servo bands") where servo patterns are formed are normally present in the magnetic layer along a longitudinal direction of the magnetic tape. A region interposed between two servo bands is referred to as a data band. The recording of magnetic signals (information) is performed on the data band and a plurality of data tracks are formed in each data band along the longitudinal direction.

Figure 1:
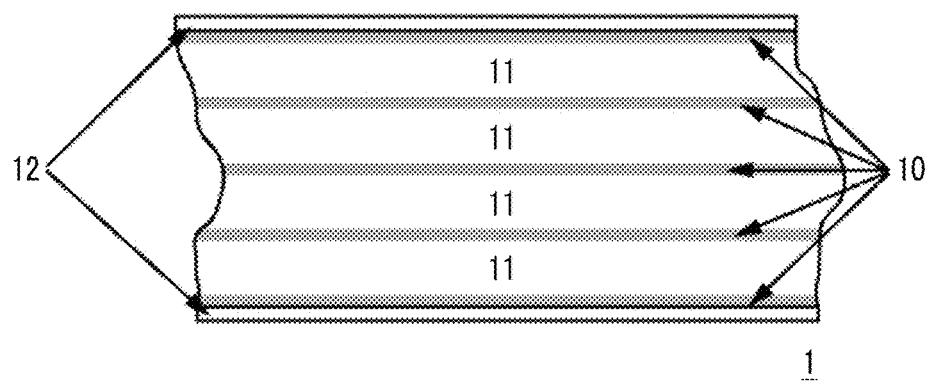
FIG. 1 shows an example of disposition of data bands and servo bands.
Figure 2:
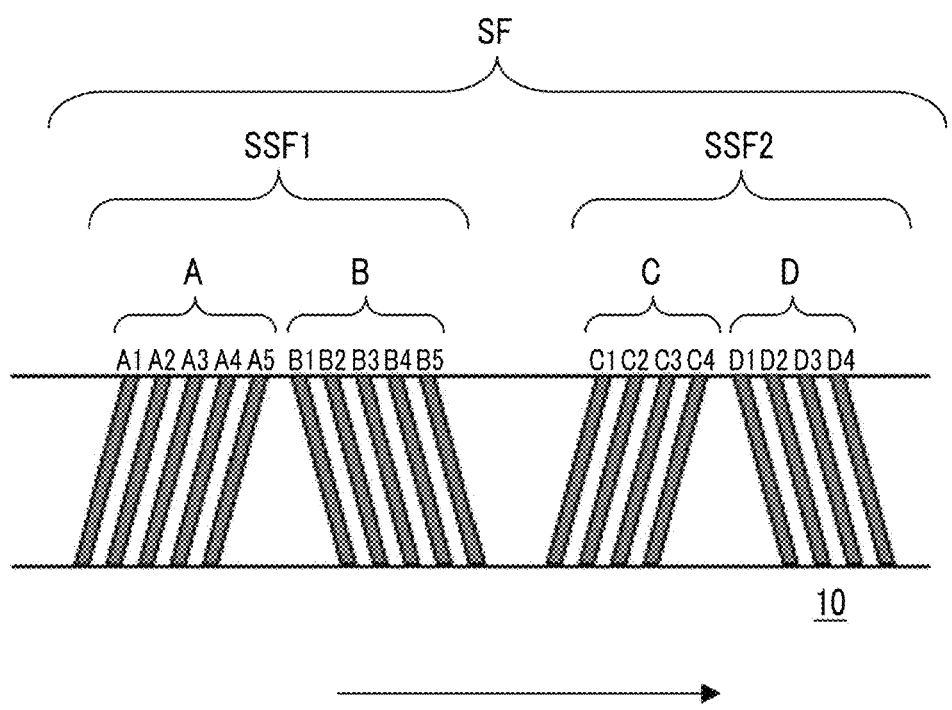
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in a LTO Ultrium format tape which is based on a local standard, a plurality of servo patterns tilted in a tape width direction as shown in FIG. 2 are formed on a servo band when manufacturing a magnetic tape. Specifically, in FIG. 2, a servo frame SF on the servo hand 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explanation. However, in practice, a plurality of servo frames are disposed in each servo band in a running direction, in the magnetic layer of the magnetic tape in which a head tracking is performed in the timing-based servo system. In FIG. 2, an arrow shows the running direction. The servo head sequentially reads servo patterns in the plurality of servo frames while running on the magnetic layer.

In the timing-based servo system, a position of a servo head is recognized based on an interval of time when two servo patterns having different shapes are read by the servo head (servo signals are reproduced) and an interval of time when two servo patterns having the same shapes are read. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time when the two servo patterns having different shapes are read by the servo head is, for example, an interval between the time when any servo pattern of the A burst is read and the time when any servo pattern of the B burst is read. An interval of the time when the two servo patterns having the same shapes are read by the servo head is, for example, an interval between the time when any servo pattern of the A burst is read and the time when any servo pattern of the C burst is read. The timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIG. 1 and FIG. 2, but also to entire timing-based servo systems. In a case where signal defect occurs at the time of servo signal reproducing in the magnetic tape device using such a timing-based servo system, a measurement result of a time interval is less likely to be obtained in a place (servo frame) where the defect occurs. As a result, when a magnetic head performs the recording or reproduction of magnetic signals (information) by allowing the running of the magnetic tape, the operation in which the magnetic head causes to be moved in a width direction, and positioning of the head is performed is less likely to be carried out in part. Regarding the point described above, in the research of the inventors, it was clear that signal defect significantly occurs at the time of servo signal reproducing in the magnetic tape in which a total thickness is equal to or smaller than 5.30 μm and the magnetic layer surface Ra is equal to or smaller than 1.8 nm. The inventors have considered that, a cause of occurrence of signal defect at the time of servo signal reproducing is a disturbance of smooth sliding between the servo head and the surface of the magnetic layer (hereinafter, referred to as a "decrease in sliding properties"). The inventors have surmised that the magnetic tape in which a total thickness is equal to or smaller than 5.30 μm and the magnetic layer surface Ra is equal to or smaller than 1.8 nm is different from the magnetic tape in the related art in terms of a contact state of the servo head and the surface of the magnetic layer, and this point may be a cause of the decrease in sliding properties, However, this is merely a surmise, With respect to this, as a result of intensive studies of the inventors, it was clear that, when the surface part C—H derived C concentration is set to be equal to or greater than 45 atom %, it is possible to prevent occurrence of the signal defect at the time of servo signal reproducing in the magnetic tape in which a total thickness is equal to or smaller than 5.30 μm and the magnetic layer surface Ra is equal to or smaller than 1.8 nm. The inventors have considered that, in the magnetic tape in which one or more components selected from the group consisting of fatty acid and fatty acid amide are included at least in the magnetic layer and the surface part C—H derived C concentration is equal to or greater than 45 atom %, a larger amount of one or more components selected from the group consisting of fatty acid and fatty acid amide is present in the extremely outermost surface part of the magnetic layer, compared to the amount thereof in the magnetic tape of the related art. The inventors have surmised that presence of a large amount of one or more components selected from the group consisting of fatty acid and fatty acid amide in the extremely outermost surface part of the magnetic layer contributes the improvement of the sliding properties between the servo head and the surface of the magnetic layer. In addition, the inventors have considered that this point contributes the prevention of occurrence of signal defect at the time of servo signal reproducing in the magnetic tape in which the total thickness is equal to or smaller than 5.30 μm and the magnetic layer surface Ra is equal to or smaller than 1.8 nm.

However, the descriptions described above are the surmise of the inventors and the invention is not limited thereto.

Hereinafter, the magnetic tape will be described more specifically.

Magnetic Layer Surface Ra

The center line average surface roughness Ra (magnetic layer surface Ra) measured regarding the surface of the magnetic layer of the magnetic tape is equal to or smaller than 1.8 nm. In the magnetic tape in which the magnetic layer surface Ra is equal to or smaller than 1.8 nm and the total thickness is equal to or smaller than 5.30 μm, the frequency of occurrence of signal defect at the time of servo signal reproducing is increased in the timing-based servo system, when no measures are provided. With respect to this, in the magnetic tape having the surface part C—H derived C concentration equal to or greater than 45 atom %, it is possible to prevent occurrence of signal defect at the time of servo signal reproducing, although the magnetic layer surface Ra is equal to or smaller than 1.8 nm and the total thickness is equal to or smaller than 5.30 μm. The surmise of the inventors regarding this point is as described above. In addition, the magnetic tape having the magnetic layer surface Ra equal to or smaller than 1.8 nm can show excellent electromagnetic conversion properties. From a viewpoint of further improvement of the electromagnetic conversion properties, the magnetic layer surface Ra is preferably equal to or smaller than 1.7 nm and more preferably equal to or smaller than 1.6 nm. In addition, the magnetic layer surface Ra can be, for example, equal to or greater than 1.2 nm or equal to or greater than 1.3 nm. Here, a low magnetic layer surface Ra is preferable from a viewpoint of the improvement of the electromagnetic conversion properties, and thus, the magnetic layer surface Ra may be smaller than the exemplified values.

The magnetic layer surface Ra can be controlled by a well-known method. For example, the magnetic layer surface Ra can be changed in accordance with a size of various powder (for example, ferromagnetic powder, non-magnetic powder which may be arbitrarily included, and the like) included in the magnetic layer or manufacturing conditions of the magnetic tape, and thus, by adjusting these, it is possible to obtain a magnetic tape having the magnetic layer surface Ra equal to or smaller than 1.8 nm.

Surface Part C—H Derived C Concentration

The surface part C—H derived C concentration of the magnetic tape is equal to or greater than 45 atom %. The surface part C—H derived C concentration is preferably equal to or greater than 48 atom %, more preferably equal to or greater than 50 atom %, even more preferably equal to or greater than 55 atom %, and still more preferably equal to or greater than 60 atom %, from a viewpoint of further prevention of the occurrence of signal defect at the time of servo signal reproducing in the timing-based servo system. According to the research of the inventors, higher surface part C—H derived C concentration tends to he preferable, from a viewpoint of further prevention of the occurrence of signal defect at the time of servo signal reproducing in the timing-based servo system. Thus, from this point, the upper limit of the surface part C—H derived C concentration is not limited. As an example, the upper limit thereof, for example, can be set to be equal to or smaller than 95 atom %, equal to or smaller than 90 atom %, equal to or smaller than 85 atom %, equal to or smaller than 80 atom %, equal to or smaller than 75 atom %, and equal to or smaller than 70 atom %.

As described above, the surface part C—H derived C concentration is a value obtained by analysis using ESCA. A region for the analysis is a region having an area of 300 µm×700 µm at an arbitrary position of the surface of the magnetic layer of the magnetic tape. The qualitative analysis is performed by wide scan measurement (pass energy: 160 eV, scan range: 0 to 1,200 eV energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to he measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of .a peak of a C—H bond of the C1s spectra is performed, and a percentage (peak area ratio) of the separated C—H peak occupying the C1s spectra is calculated. A C—H derived C concentration is calculated by multiplying the calculated C—H peak area ratio by the C concentration.

An arithmetical mean of values obtained by performing the above-mentioned process at different positions of the surface of the magnetic layer of the magnetic tape three times is set as the surface part C—H derived C concentration. In addition, the specific aspect of the process described above is shown in Examples which will be described later.

As preferred means for adjusting the surface part C—H derived C concentration described above to be equal to or greater than 45 atom %, a cooling step can be performed in a. non-magnetic layer forming step which will be described later specifically. However, the magnetic tape is not limited to a magnetic tape manufactured through such a cooling step.

Fatty Acid and Fatty Acid Amide

The magnetic tape includes one or more components selected from the group consisting of fatty acid and fatty acid amide at least in the magnetic layer. The magnetic layer may include only one or both of fatty acid and fatty acid amide. The inventors have considered that presence of a large amount of the components in the extremely outermost surface part of the magnetic layer contributes the prevention of the occurrence of signal defect at the time of servo signal reproducing in the timing-based servo system using the magnetic tape having the magnetic layer surface Ra equal to or smaller than 1.8 nm and the total thickness equal to or smaller than 5.30 µm as described above. In addition, in the magnetic tape having the non-magnetic layer, which will be described later specifically, between the non-magnetic support and the magnetic layer, one or more components selected from the group consisting of fatty acid and fatty acid amide may be included in the non-magnetic layer. The non-magnetic layer can play a role of holding a lubricant such as fatty acid or fatty acid amide and supply the lubricant to the magnetic layer. The lubricant such as fatty acid or fatty acid amide included in the non-magnetic layer may be moved to the magnetic layer and present in the magnetic layer.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using fatty acid and stearic acid, it is preferable to use stearic acid amide and/or stearic acid ester.

The content of fatty acid of a magnetic layer forming composition is, for example, 0.1 to 10.0 parts by mass and is preferably 1.0 to 7.0 parts by mass, with respect to 100.0 parts by mass of ferromagnetic powder. In a case of adding two or more kinds of different fatty acids to the magnetic layer forming composition, the content thereof is the total content of two or more kinds of different fatty acids. The same applies to other components. In addition, in the invention and the specification, a given component may be used alone or used in combination of two or more kinds thereof, unless otherwise noted.

The content of fatty acid amide in the magnetic layer forming composition is, for example, 0.1 to 3.0 parts by mass and is preferably 0.1 to 1.0 part by mass with respect to 100.0 parts by mass of ferromagnetic powder.

Meanwhile, the content of fatty acid in a non-magnetic layer forming composition is, for example, 1.0 to 10.0 parts by mass and is preferably 1.0 to 7.0 parts by mass with respect to 100.0 parts by mass of non-magnetic powder. In addition, the content of fatty acid amide in the non-magnetic layer forming composition is, for example, 0.1 to 3.0 parts by mass and is preferably 0.1 to 1.0 part by mass with respect to 100.0 parts by mass of non-magnetic powder.

Next, the magnetic layer and/or the non-magnetic layer of the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic powder and other powder is an average particle size obtained by the method described above, unless otherwise noted. The average particle size shown in Examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly conic into contact with each other, and also includes an aspect in which a binder and/or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a ease of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably in a range of 50 to 90 mass % and more preferably in a range of 60 to 90 mass %. The components other than the ferromagnetic powder of the magnetic layer are at least a binder and one or more components selected from the group consisting of fatty acid and fatty acid amide, and one or more kinds of additives may be arbitrarily included. A high filling percentage of the ferromagnetic powder in the magnetic layer is preferable from a viewpoint of improvement recording density.

Binder

The magnetic tape is a coating type magnetic tape, and the magnetic layer includes a binder together with the ferromagnetic powder. The binder is one or more kinds of resin. As the binder, various resins normally used as a binder of the coating type magnetic recording medium can be used. For example, as the binder, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binder even in the non-magnetic layer and/or a back coating layer which will be described later. For the binder described above, description disclosed in paragraphs 0028 to 0031 of JP2010-24113A can be referred to. An average molecular weight of the resin used as the binder can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in Examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binder. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binder, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binder in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, the curing agent described above is used as an example. In addition, examples of the additive which can be included in the magnetic layer include a non-magnetic filler, a lubricant, a dispersing agent, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, when 1 g of the particles is added to 100 ml, of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index of the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the abrasive in the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the magnetic layer surface Ra.

Fatty Acid Ester

One or both of the magnetic layer and the non-magnetic layer which will be described later specifically may include or may not include fatty acid ester.

All of Fatty acid ester, fatty acid, and fatty acid amide are components which can function as a lubricant. The lubricant is generally broadly divided into a fluid lubricant and a boundary lubricant. Fatty acid ester is called a component which can function as a fluid lubricant, whereas fatty acid and fatty acid amide is called as a component which can function as a boundary lubricant. It is considered that the boundary lubricant is a lubricant which can be attached to a surface of powder (for example, ferromagnetic powder) and form a rigid lubricant film to decrease contact friction.

Meanwhile, it is considered that the fluid lubricant is a lubricant which can form a liquid film on a surface of a magnetic layer to decrease flowing of the liquid film. As described above, it is considered that the operation of fatty acid ester is different from the operation fatty acid and fatty acid amide as the lubricants. As a result of intensive studies of the inventors, when the surface part C—H derived C concentration which is considered as an index of the presence amount of one or more components selected from the group consisting of fatty acid and fatty acid amide in the extremely outermost surface part of the magnetic layer is set to be equal to or greater than 45 atom %, it is possible to prevent the occurrence of signal defect at the time of servo signal reproducing in the timing-based servo system using the magnetic tape having the magnetic layer surface Ra equal to or smaller than 1.8 nm and the total thickness equal to or smaller than 5.30 μm.

As fatty acid ester, esters of various fatty acids described above regarding fatty acid can be used. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate, The content of fatty acid ester of the magnetic layer forming composition is, for example, 0 to 10.0 parts by mass and is preferably 1.0 to 7.0 parts by mass with respect to 100.0 parts by mass of ferromagnetic powder.

In addition, the content of fatty acid ester in the non-magnetic layer forming composition is, for example, 0 to 10.0 parts by mass and is preferably 1.0 to 7.0 parts by mass with respect to 100.0 parts by mass of non-magnetic powder.

Non-Magnetic Layer

Next, the non-magnetic layer will be described. The magnetic tape may include a magnetic layer directly on a non-magnetic support, and may include a non-magnetic layer including non-magnetic powder and a binder between the non-magnetic support and the magnetic layer. The non-magnetic powder used in the non-magnetic layer may be inorganic substances or organic substances. In addition, carbon black and the like can be used. Examples of the inorganic substances include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma process, easy-bonding process, or heating process may be performed with respect to these supports in advance.

Back Coating Layer

The magnetic tape can also include a back coating layer including non-magnetic powder and a binder on a surface of the non-magnetic support opposite to the surface including the magnetic layer. The back coating layer preferably includes any one or both of carbon black and inorganic powder. In regards to the binder included in the back coating layer and various additives which can be arbitrarily included in the back coating layer, a well-known technology regarding the treatment of the magnetic layer and/or the non-magnetic layer can be applied.

Total Thickness of Magnetic Tape

The total thickness of the magnetic tape is equal to or smaller than 5.30 μm. It is preferable to reduce the total thickness (thinning) from a viewpoint of an increase in recording capacity per one reel of the magnetic tape cartridge. The total thickness of the magnetic tape may be equal to or smaller than 5.20 μm, equal to or smaller than 5.10 μm, or equal to or smaller than 5.00 μm, for example. Furthermore, for example, from a viewpoint of availability (handling properties) of the magnetic tape or the like, the total thickness of the magnetic tape is preferably equal to or greater than 1.00 μm, more preferably equal to or greater than 2.00 μm, and even more preferably equal to or greater than 3.00 μm.

Thicknesses of Non-Magnetic Support and Each Layer

A thickness of the non-magnetic support is preferably 3.00 to 4.50 μm. A thickness of the magnetic layer is preferably equal to or smaller than 0.15 μm and more preferably equal to or smaller than 0.10 μm, from a viewpoint of realizing recording at high density recently required. The thickness of the magnetic layer is even more preferably in a range of 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

The thickness of the non-magnetic layer is, for example, 0.10 to 1.50 μm and is preferably 0.10 to 1.00 μm.

A thickness of the back coating layer is preferably equal to or smaller than 0.90 and more preferably in a range of 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can he acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Manufacturing of Magnetic Tape in Which Timing-Based Servo Pattern is Formed

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binder normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binder may be separately added in a kneading step, a dispersing step, and a mixing step for adjusting viscosity after the dispersion. In a manufacturing step of the magnetic tape, a well-known manufacturing technology of the related art can be used as a part of the step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are suitable. These dispersion beads are preferably used by optimizing a bead diameter and a filling percentage. As a dispersion device, a well-known dispersion device can be used.

Coating Step, Cooling Step, and Heating and Drying Step

The magnetic layer can be formed by applying the magnetic layer forming composition directly onto the non-magnetic support or by performing multilayer applying of the magnetic layer forming composition with the non-magnetic layer forming composition on the non-magnetic support in order or at the same time. For details of the coating for forming each layer, a description disclosed in a paragraph 0066 of JP2010-231843A can be referred to.

As described above, in one aspect, the magnetic tape includes a non-magnetic layer between the non-magnetic support and the magnetic layer. Such a magnetic tape is preferably manufactured by successive multilayer coating. A manufacturing step of performing the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

In the manufacturing method of performing such successive multilayer coating, it is preferable to perform the non-magnetic layer forming step by using the non-magnetic layer forming composition including one or more components selected from the group consisting of fatty acid and fatty acid amide in the coating step, and to perform a cooling step of cooling the coating layer between the coating step and the heating and drying step, in order to adjust the surface part C—H derived C concentration to be equal to or greater than 45 atom %, in the magnetic tape including at least one or more components selected from the group consisting of fatty acid and fatty acid amide in the magnetic layer. The reason thereof is not clear, but the inventors have surmised that the reason thereof is because the components (fatty acid and/or fatty acid amide) are easily moved to the surface of the non-magnetic layer at the time of solvent volatilization of the heating and drying step, by cooling the coating layer of the non-magnetic layer forming composition before the heating and drying step. However, this is merely the surmise, and the invention is not limited thereto.

In the magnetic layer forming step, a coating step of applying a magnetic layer forming composition including ferromagnetic powder, a binder, and a solvent onto a non-magnetic layer to form a coating layer, and a heating and drying step of drying the formed coating layer by a heating process can be performed. The magnetic tape includes one or more components selected from the group consisting of fatty acid and fatty acid amide in the magnetic layer. In a case where the magnetic tape includes a non-magnetic layer between the non-magnetic support and the magnetic layer, in order to manufacture such a magnetic tape, the magnetic layer forming composition preferably includes one or more components selected from the group consisting of fatty acid and fatty acid amide. However, it is not necessary that the magnetic layer forming composition includes one or more components selected from the group consisting of fatty acid and fatty acid amide. This is because that a magnetic layer including one or more components selected from the group consisting of fatty acid and fatty acid amide can be formed, by applying the magnetic layer forming composition onto a non-magnetic layer to form the magnetic layer, after the components included in the non-magnetic layer forming composition are moved to the surface of the non-magnetic layer.

Hereinafter, a specific aspect of the manufacturing method of the magnetic tape will be described with reference to FIG. 3. However, the invention is not limited to the following specific aspect.

FIG. 3 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 3, an operation of sending a non-magnetic support (elongated film) from a sending part and winding the non-magnetic support around a winding part is continuously performed, and various processes of coating, drying, and orientation are performed in each part or each zone shown in FIG. 3, and thus, it is possible to sequentially form a non-magnetic layer and a magnetic layer on one surface of the running non-magnetic support by multilayer coating and to form a back coating layer on the other surface thereof. In the aspect shown in FIG. 3, the manufacturing step which is normally performed for manufacturing the coating type magnetic recording medium can be performed in the same manner except for including a cooling zone.

The non-magnetic layer forming composition is applied onto the non-magnetic support sent from the sending part in a first coating part (coating step of non-magnetic layer forming composition).

After the coating step, a coating layer of the non-magnetic layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably in a range of −10° C. to 0° C. and more preferably in a range of −5° C. to 0° C. The time for performing the cooling step (for example, time while an arbitrary part of the coating layer is delivered to and sent from the cooling zone (hereinafter, also referred to as a "staying time")) is not particularly limited, and when the time described above is long, the surface part C—H derived C concentration tends to be increased. Thus, the time described above is preferably adjusted by performing preliminary experiment if necessary, so that the surface part C—H derived C concentration equal to or greater than 45 atom % is realized. In the cooling step, cooled air may blow to the surface of the coating layer.

After the cooling zone, in a first heating process zone, the coating layer is heated after the cooling step to dry the coating layer (heating and drying step). The heating and drying process can be performed by causing the non-magnetic support including the coating layer after the cooling step to pass through the heated atmosphere. An atmosphere temperature of the heated atmosphere here is, for example, approximately 60° to 140°. Here, the atmosphere temperature may be a temperature at which the solvent is volatilized and the coating layer is dried, and the atmosphere temperature is not limited to the atmosphere temperature in the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After that, while the coating layer of the magnetic layer forming composition is wet, an orientation process of the ferromagnetic powder in the coating layer is performed in an orientation zone. For the orientation process, a description disclosed in a paragraph 0067 of JP2010-231843A can be referred to.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By the step described above, it is possible to obtain the magnetic tape including the non-magnetic layer and the magnetic layer in this order on one surface of the non-magnetic support and including the back coating layer on the other surface thereof.

In order to manufacture the magnetic tape, well-known various processes for manufacturing the coating type magnetic recording medium can be performed. For example, for various processes, descriptions disclosed in paragraphs 0067 to 0069 of JP2010-231843A can be referred to, in addition, as an example of various processes, surface treatment of the surface of the magnetic layer can also be used. The surface treatment is preferably performed, in order to increase surface smoothness of the magnetic layer. As an example, for the surface treatment of the surface of the magnetic layer, a polishing process performed using polishing means disclosed in JP1993-62174A (JP-H05-62174A) can be used. For the surface treatment, descriptions disclosed in paragraphs 0005 to 0032 and all of the drawings of JP1993-62174A (JP-H05-62174A) can be referred to.

Formation of Servo Pattern

The magnetic tape includes a timing-based servo pattern in the magnetic layer. FIG. 1 shows a disposition example of a region (servo band) in which the timing-based servo pattern is formed and a region (data band) interposed between two servo bands. FIG. 2 shows a disposition example of the timing-based servo patterns. Here, the disposition example shown in each drawing is merely an example, and the servo pattern, the servo bands, and the data bands may be disposed in the disposition according to a system of the magnetic tape device (drive). In addition, for the shape and the disposition of the timing-based servo pattern, a well-known technology such as disposition examples shown in FIG. 4, FIG. 5, FIG. 6, FIG. 9, FIG. 17, and FIG. 20 of U.S. Pat. No. 5,689,384A can be applied without any limitation, for example.

The servo pattern can be formed by magnetizing a specific region of the magnetic layer by a servo write head mounted on a servo writer. A region to be magnetized by the servo write head (position where the servo pattern is formed) is determined by standards. As the servo writer, a commercially available servo writer or a servo writer having a well-known configuration can be used. For the configuration of the servo writer, well-known technologies such as technologies disclosed in JP2011-175687A, U.S. Pat. Nos. 5,689,384A, and 6,542,325B can be referred to without any limitation, for example.

The magnetic tape described above according to one aspect of the invention is a magnetic tape thinned so that the total thickness becomes equal to or smaller than 5.30 μm, and has high surface smoothness in which the magnetic layer surface Ra is equal to or smaller than 1.8 nm, and it is possible to prevent the occurrence of signal defect at the time of servo signal reproducing in the timing-based servo system.

Magnetic Tape Device

One aspect of the invention relates to a magnetic tape device including the magnetic tape, a magnetic head, and a servo head.

The details of the magnetic tape mounted on the magnetic tape device are as described above. Such a magnetic tape includes timing-based servo patterns. Accordingly, a magnetic signal is recorded on the data band by the magnetic head to form a data track, and/or, when reproducing the recorded signal, a head tracking of a timing-based servo type is performed based on the read servo pattern, while reading the servo pattern by the servo head, and accordingly, it is possible to cause the magnetic head to follow the data track with high accuracy.

As the magnetic head mounted on the magnetic tape device, a well-known magnetic head which can perform the recording and/or reproducing of the magnetic signal with respect to the magnetic tape can he used. A recording head and a reproduction head may be one magnetic head or may be separated magnetic heads. As the servo head, a well-known servo head which can read the timing-based servo pattern of the magnetic tape can be used. For example, a well-known MR head mounting a MR element can be used as a servo head. At least one or two or more servo heads may be included in the magnetic tape device.

For details of the head tracking of the timing-based servo system, for example, well-known technologies such as technologies disclosed in U.S. Pat. Nos. 5,689,384A, 6,542,325B, and 7,876,521B can be used without any limitation.

A commercially available magnetic tape device generally includes a magnetic head and a servo head in accordance to a standard. In addition, a commercially available magnetic tape device generally has a servo controlling mechanism for realizing head tracking of the timing-based servo system in accordance to a standard. The magnetic tape device according to one aspect of the invention can be configured by incorporating the magnetic tape according to one aspect of the invention to a commercially available magnetic tape device.

EXAMPLES

Hereinafter, the invention will be described with reference to Examples. However, the invention is not limited to aspects shown in the Examples. "Parts" and "%" in the following description mean "parts by mass" and "mass %", unless otherwise noted.

Magnetic Tape Manufacturing Examples

Examples 1 to 8 and Comparative Examples 1 to 9

1. Preparation of Alumina Dispersion 3.0 parts of 2,3-dihydroxynaphthalene (manufactured by Tokyo Chemical Industry Co., Ltd.), 31.3 parts of a 32% solution (solvent. is a mixed solvent of methyl ethyl ketone and toluene) of a polyester polyurethane resin having a $SO_3Na$ group as a polar group (UR-4800 (amount of a polar group: 80 meq/kg) manufactured by Toyoho Co., Ltd. (Japanese registered trademark)), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

2. Magnetic Layer Forming Composition List
Magnetic Solution
Ferromagnetic powder: 100.0 parts
Ferromagnetic hexagonal barium ferrite powder or ferromagnetic metal powder (see Table 5)
$SO_3Na$ group-containing polyurethane resin: 14.0 parts
Weight-average molecular weight: 70,000, $SO_3Na$ group: 0.2 meq/g
Cyclohexanone: 150.0 parts
Methyl ethyl ketone: 150.0 parts
Abrasive liquid
Alumina dispersion prepared in the section 1.: 6.0 parts
Silica Sol (Projection Forming Agent Liquid)
Colloidal silica (average particle size of 120 nm): 2.0 parts
Methyl ethyl ketone: 1.4 parts
Other Components
Stearic acid: see Table 5
Stearic acid amide: see Table 5
Butyl stearate: see Table 5
Polyisocyanate (CORONATE (Japanese registered trademark) manufactured by Nippon Polyurethane Industry): 2.5 parts
Finishing Additive Solvent.
Cyclohexanone: 200.0 parts
Methyl ethyl ketone: 200.0 parts In Table 5, BF indicates ferromagnetic hexagonal barium ferrite powder having an average particle size (average plate diameter) of 21 nm, and MP indicates ferromagnetic metal powder having an average particle size (average long axis length) of 30 nm.

3. Non-Magnetic Layer Forming Composition List
Non-magnetic inorganic powder: α-iron oxide: 100.0 parts
Average particle size (average long axis length): 015 μm
Average acicular ratio: 7
BET specific surface area: 52 $m^2/g$
Carbon black: 20.0 parts
Average particle size: 20 nm
$SO_3Na$ group-containing polyurethane resin: 18.0 parts
Weight-average molecular weight: 70,000, $SO_3Na$ group: 0.2 meq/g
Stearic acid: see Table 5
Stearic acid amide: see Table 5
Butyl stearate: see Table 5
Cyclohexanone: 300.0 parts
Methyl ethyl ketone: 300.0 parts 4. Back Coating Layer Forming Composition List
Non-magnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
Vinyl chloride copolymer: 13.0 parts
Sulfonate group-containing polyurethane resin: 6.0 parts
Phenylphosphonic acid: 3.0 parts
Cyclohexanone: 155.0 parts
Methyl ethyl ketone: 155.0 parts
Polyisocyanate: 5.0 parts
Cyclohexanone: 200.0 parts 5. Preparation of Each Layer Forming Composition
The magnetic layer forming composition was prepared by the following method. The magnetic solution was prepared by dispersing (beads-dispersing) each component with a batch type vertical sand mill for 24 hours. As the dispersion beads, zirconia beads having a bead diameter of 0.5 mm were used. The prepared magnetic solution and the abrasive liquid were mixed with other components (silica sol, other components, and finishing additive solvent) and heads-dispersed for 5 minutes by using the sand mill, and a process (ultrasonic dispersion) was performed with a batch type ultrasonic device (20 kHz, 300 W) for 0.5 minutes. After that, the filtering was performed by using a filter having an average hole diameter of 0.5 μm, and the magnetic layer forming composition was prepared.

The non-magnetic layer forming composition was prepared by the following method. Each component excluding a lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver. The dispersion liquid obtained as described above was filtered with a filter having an average hole diameter of 0.5 μm and a non-magnetic layer forming composition was prepared.

The back coating layer forming composition was prepared by the following method. Each component excluding Polyisocyanate and Cyclohexanone was kneaded and diluted by an open kneader, and subjected to a dispersing process of 12 passes, with a transverse heads mill dispersion device and zirconia beads having a bead diameter of 1 mm, by setting a bead filling percentage as 80 volume %, a circumferential speed of rotor tip as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 μm and a back coating layer forming composition was prepared.

6. Manufacturing of Magnetic Tape in Which Timing-Based Servo Pattern is Formed

A magnetic tape was manufactured by the specific aspect shown in. FIG. 3. The magnetic tape was specifically manufactured as follows.

A support made of polyethylene naphthalate having the thickness shown in Table 5 was sent from the sending part, and the non-magnetic layer forming composition prepared in the section 5. was applied to one surface thereof so that the thickness after the drying became the thickness shown in Table 5 in the first coating part, to form a coating layer. The cooling step was performed by passing the formed coating layer through the cooling zone in which the atmosphere temperature was adjusted to 0° C. for the staying time shown in Table 5 while the coating layer was wet, and then the heating and drying step was performed by passing the coating layer through the first heating process zone at the atmosphere temperature of 100° C., to form a non-magnetic layer.

Then, the magnetic layer forming composition prepared in the section 5. was applied onto the non-magnetic layer so that the thickness after the drying became the thickness shown in Table 5 in the second coating part, and a coating layer was formed. A vertical orientation process was performed in the orientation zone by applying a magnetic field having a magnetic field strength of 0.3 T to the surface of the coating layer of the magnetic layer forming composition in a vertical direction while the coating layer was wet (not dried), and the coating layer was dried in the second heating process zone (atmosphere temperature of 100° C.).

After that, in the third coating part the back coating layer forming composition prepared in the section 5. was applied to the surface of the non-magnetic support made of polyethylene naphthalate on a side opposite to the surface where the non-magnetic layer and the magnetic layer were formed, so that the thickness after the drying became the thickness shown in Table 5, to form a coating layer, and the formed coating layer was dried in a third heating process zone (atmosphere temperature of 100° C.).

After that, a surface smoothing treatment (calender process) was performed with a calender roll configured of only a metal roll, at a speed of 80 m/min, linear pressure of 294 kN/m (300 kg/cm), and a surface temperature of a calender roll shown in Table 5. As the calender process conditions are strengthened (for example, as the surface temperature of the calender roll increases), the magnetic layer surface Ra tends to decrease.

Then, a heating process was performed in the environment of the atmosphere temperature of 70° C. for 36 hours. After the heating process, the layer was slit to have a width of ½ inches (0.0127 meters), and a surface treatment (aspects shown in FIGS. 1 to 3 of JP1993-62174A (JP-H05-62174A)) using a diamond wheel disclosed in JP1993-62174A (JP-H05-62174A) was performed, to obtain a magnetic tape.

In Table 5, in the Comparative Examples in which "not performed" is disclosed in a column of the cooling zone staying time, a magnetic tape was manufactured by a manufacturing step not including the cooling zone.

7. Formation of Timing-Based Servo Pattern

In a state where the magnetic layer of the manufactured magnetic tape was demagnetized, servo patterns having disposition and shapes according to the LTO Ultrium format were formed on the magnetic layer by using a servo write head mounted on a servo testing machine. Accordingly, a magnetic tape including data bands, servo bands, and guide bands in the disposition according to the LTO Ultrium format in the magnetic layer, and the servo pattern (timing-based servo pattern) having the disposition and the shape according to the LTO Ultrium format on the servo band was manufactured. Each of the magnetic tape of Examples 1 to 8 and Comparative Examples 1 to 9 manufactured as described above was used in the following evaluation. Moreover, the servo testing machine includes a servo write head and a servo head. The servo testing machine was also used in an evaluation which will be described later.

Thicknesses of each layer and the non-magnetic support and the total thickness of the manufactured magnetic tape were obtained by the following method. It was confirmed that thickness of each layer formed was the thickness shown in Table 5.

A cross section of the magnetic tape in a thickness direction was exposed to ion beams, and the exposed cross section was observed with a scan electron microscope. In the cross section observation, various thicknesses were acquired as an arithmetical mean of thicknesses acquired at two positions of the cross section in the thickness direction.

Evaluation Method

1. Magnetic Layer Surface Ra

The measurement regarding a measurement area of 40 μm×40 μm was performed with an atomic force microscope (AFM, Nanoscope 4 manufactured by Veeco Instruments, Inc.), and a center line average surface roughness Ra of the surface of the magnetic layer of the magnetic tape was acquired. A scan speed (probe movement speed) was set as 40 μm/sec and a resolution was set as 512 pixel×512 pixel.

2. Surface Part C—H Derived C Concentration

The X-ray photoelectron spectroscopic analysis was performed regarding the surface of the magnetic layer of the magnetic tape (measurement region: 300 μm×700 μm) by the following method using an ESCA device, and a surface part C—H derived C concentration was calculated from the analysis result.

Analysis and Calculation Method

All of the measurement (1) to (3) described below were performed under the measurement conditions shown in Table 1.

TABLE 1

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutraliser) | ON (used) |
| Photoelectron take-off angle (take-off angle) | 10 deg. (angle formed by a detector and a sample surface) |

(1) Wide Scan Measurement

A wide scan measurement (measurement conditions: see Table 2) was performed regarding the surface of the magnetic layer of the magnetic tape with the ESCA device, and the types of the detected elements were researched (qualitative analysis).

TABLE 2

| Scan range | Pass Energy | Energy resolution (Step) | Capturing time (Dwell) | Number of integration times (Sweeps) |
|---|---|---|---|---|
| 0 to 1200 eV | 160 eV | 1 eV/step | 100 ms/step | 5 |

(2) Narrow Scan Measurement

All elements detected in (1) described above were subjected to narrow scan measurement (measurement conditions: see Table 3). An atom concentration (unit: atom %) of each element detected was calculated from a peak surface area of each element by using software for a data process attached to the device (Vision 2.2.6). Here, the C concentration was also calculated.

TABLE 3

| Spectra [Note 1] | Scan range | Pass Energy | Energy resolution (Step) | Capturing time (Dwell) | Number of integration times (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

Note 1)
Spectra shown in Table 3 (element type) are examples, and in a case where an element not shown in Table 3 is detected by the qualitative analysis of the section (1), the same narrow scan measurement is performed in a scan range including entirety of spectra of the elements detected.

Note 2)
The spectra having excellent signal-to-noise ratio (S/N ratio) were measured when the number of integration times is set as three times. However, even when the number of integration times regarding the entirety of spectra is set as five times, the quantitative results are not affected.

(3) Acquiring of C1s Spectra

The C1s spectra were acquired under the measurement conditions disclosed in Table 4. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C—H peak occupying the C1s spectra was calculated. A C—H derived C concentration was calculated by multiplying the calculated C—H peak area ratio by the C concentration acquired in (2) described above.

TABLE 4

| Spectra | Scan range | Pass Energy | Energy resolution (Step) | Capturing time (Dwell) | Number of integration times (Sweeps) |
|---|---|---|---|---|---|
| C1s | 276 to 296 eV | 10 eV | 0.1 eV/step | 200 ms/step | 20 |

An arithmetical mean of values obtained by performing the above-mentioned process at different positions of the surface of the magnetic layer of the magnetic tape three times was set as the surface part C—H derived C concentration.

3. Confirmation of Contribution of Fatty Acid and Fatty Acid Amide with Respect to Surface Part C—H Derived C Concentration (1) Two magnetic tapes (sample tapes) were manufactured by the same method as that in Example 1. The measurement regarding one sample tape was performed by the ESCA device, and then, the solvent extraction of the other sample tape was performed in a non-measured state (solvent: methanol).

When the quantity of fatty acid, fatty acid amide, and fatty acid ester in the solution obtained by the extraction was determined by gas chromatography analysis, a difference in the quantitative values of fatty acid (stearic acid) and fatty acid amide (stearic acid amide) in the two sample tapes was not obtained. Meanwhile, the quantitative value of fatty acid ester (butyl stearate) in the sample tape after the measurement was a value which is significantly lower than the quantitative value thereof in the non-measured sample tape. This is because fatty acid ester is volatilized in a vacuum chamber in which a measurement target sample is disposed during the measurement in the ESCA device.

From the results described above, it is possible to determine that fatty acid ester does not affect the surface part C—H derived C concentration acquired by the analysis performed by ESCA.

(2) Among the components included in the magnetic layer forming composition and the components included in the non-magnetic layer forming composition and present in the magnetic layer, the organic compounds excluding the solvent and polyisocyanate (crosslinked with other components by a process accompanied with the heating) are stearic acid, stearic acid amide, butyl stearate, 2,3-dihydroxynaphthalene, and a polyurethane resin. Among the components, it is possible to determine that butyl stearate does not affect the surface part C—H derived C concentration from the results (1), as described above.

Next, the effect of 2,3-dihydroxynaphthalene and a polyurethane resin with respect to the surface part C—H derived C concentration was confirmed by the following method.

Regarding 2,3-dihydroxynaphthalene and a polyurethane resin used in Example 1, C1s spectra were acquired by the same method as that described above, and regarding the acquired spectra, peak resolution of a peak positioned at the vicinity of bonding energy 286 eV and a C—H peak was performed by the process described above. A percentage (peak area ratio) of the separated peak occupying the C1s spectra was calculated, and the peak area ratio of the peak positioned at the vicinity of bonding energy 286 eV and the C—H peak was calculated.

Then, in the C1s spectra acquired in Example 1, the peak resolution of the peak positioned at the vicinity of bonding energy 286 eV was performed by the process described above. 2,3-dihydroxynaphthalene and a polyurethane resin have the peak positioned at the vicinity of bonding energy 286 eV in the C1s spectra, whereas fatty acid (stearic acid) and fatty acid amide (stearic acid amide) do not have a peak at the position described above. Accordingly, it is possible to determine that the peak positioned at the vicinity of bonding energy 286 eV of the C1s spectra acquired in Example 1 is derived from 2,3dihydroxynaphthalene and a polyurethane resin. Then, when an amount of contribution of 2,3-dihydroxynaphthalene and a polyurethane resin of the C—H peak of the C1s spectra acquired in Example 1 was calculated from the peak area ratio calculated as described above using the peaks, the amount of contribution thereof was approximately 10%. From this result, it is possible to determine that a large amount (approximately 90%) of the C—H peak of the C1s spectra acquired in Example 1 is derived from fatty acid (stearic acid) and fatty acid amide (stearic acid amide).

From this result, it was confirmed that the surface part C—H derived C concentration can be an index of the presence amount of fatty acid and fatty acid amide.

4. Frequency of Occurrence of Signal Defect at Time of Servo Signal Reproducing (Thermal Asperity)

The magnetic tape in which the timing-based servo patterns were formed was attached to the servo testing machine. In the servo testing machine, a servo head read servo patterns (servo signals were reproduced) by causing the magnetic tape to run, and bringing a surface of a magnetic layer of the magnetic tape being running to come into contact with the servo head mounting a MR element to slide thereon. Among reproduced waveforms of the servo signals obtained by reproduction, a portion in which was not in a normal burst signal, and showed output equal to or greater than 200% when an average value of noise level output was set to 100% was determined as thermal asperity, the number of times of occurrence of the thermal asperity was counted. A value (number of times/m) obtained by dividing the counted number of times of occurrence of the thermal asperity by the entire length of the magnetic tape was set as the frequency of occurrence of the thermal asperity.

The results described above are shown in Table 5.

TABLE 5

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Ferromagnetic powder | | BF | BF | BF | BF | BF | BF | BF | BF | BF |
| Magnetic layer thickness | μm | 0.10 | 0.10 | 0.10 | 0.10 | 0.10 | 0.10 | 0.10 | 0.10 | 0.10 |
| Non-magnetic layer thickness | μm | 1.00 | 0.70 | 0.70 | 0.50 | 0.70 | 0.50 | 0.70 | 0.50 | 0.50 |
| Non-magnetic support thickness | μm | 4.30 | 4.20 | 4.20 | 4.00 | 4.20 | 4.00 | 4.20 | 4.00 | 4.00 |
| Back coating layer thickness | μm | 0.60 | 0.40 | 0.30 | 0.30 | 0.30 | 0.30 | 0.30 | 0.30 | 0.30 |
| Total thickness of magnetic tape | μm | 6.00 | 5.40 | 5.30 | 4.90 | 5.30 | 4.90 | 5.30 | 4.90 | 4.90 |
| Cooling zone staying time | | Not performed | Not performed | Not performed | Not performed | Not performed | Not performed | Not performed | Not performed | Not performed |
| Magnetic layer forming composition | Stearic acid/part | 2.0 | 2.0 | 2.0 | 2.0 | 2.0 | 2.0 | 2.0 | 2.0 | 6.0 |
| | Stearic acid amide/part | 0.2 | 0.2 | 0.2 | 0.2 | 0.2 | 0.2 | 0.2 | 0.2 | 1.0 |
| | Butyl stearate/part | 2.0 | 2.0 | 2.0 | 2.0 | 2.0 | 2.0 | 2.0 | 2.0 | 2.0 |
| Non-magnetic layer forming composition | Stearic acid/part | 2.0 | 2.0 | 2.0 | 2.0 | 2.0 | 2.0 | 2.0 | 2.0 | 6.0 |
| | Stearic acid amide/part | 0.2 | 0.2 | 0.2 | 0.2 | 0.2 | 0.2 | 0.2 | 0.2 | 1.0 |
| | Butyl stearate/part | 2.0 | 2.0 | 2.0 | 2.0 | 2.0 | 2.0 | 2.0 | 2.0 | 2.0 |

TABLE 5-continued

|  |  |  |  |  |  |  |  |  |  |
|---|---|---|---|---|---|---|---|---|---|
| Surface temperature of calender roll | ° C. | 100 | 100 | 90 | 90 | 100 | 100 | 105 | 105 | 105 |
| Magnetic layer surface Ra | nm | 1.8 | 1.8 | 2.2 | 2.2 | 1.8 | 1.8 | 1.6 | 1.6 | 1.6 |
| Surface part C—H derived C concentration |  | 35% | 35% | 35% | 35% | 35% | 35% | 35% | 35% | 38% |
| Frequency of occurrence of signal defect (thermal asperity) | number of times/m | 0.07 | 0.09 | 0.05 | 0.12 | 0.80 | 1.10 | 4.20 | 7.60 | 8.10 |

|  |  | Example 1 | Example 2 | Example 3 | Example 4 | Example 5 | Example 6 | Example 7 | Example 8 |
|---|---|---|---|---|---|---|---|---|---|
| Ferromagnetic powder |  | BF | BF | BF | BF | BF | BF | MP | BF |
| Magnetic layer thickness | μm | 0.10 | 0.10 | 0.10 | 0.10 | 0.10 | 0.10 | 0.10 | 0.10 |
| Non-magnetic layer thickness | μm | 0.70 | 0.70 | 0.70 | 0.70 | 0.70 | 0.50 | 0.70 | 0.70 |
| Non-magnetic support thickness | μm | 4.20 | 4.20 | 4.20 | 4.20 | 4.20 | 4.00 | 4.20 | 4.20 |
| Back coating layer thickness | μm | 0.30 | 0.30 | 0.30 | 0.30 | 0.30 | 0.30 | 0.30 | 0.30 |
| Total thickness of magnetic tape | μm | 5.30 | 5.30 | 5.30 | 5.30 | 5.30 | 4.90 | 5.30 | 5.30 |
| Cooling zone staying time |  | 1 second | 5 seconds | 50 seconds | 180 seconds | 300 seconds | 5 seconds | 5 seconds | 50 seconds |
| Magnetic layer forming composition | Stearic acid/part | 2.0 | 2.0 | 2.0 | 2.0 | 2.0 | 2.0 | 2.0 | 2.0 |
|  | Stearic acid amide/part | 0.2 | 0.2 | 0.2 | 0.2 | 0.2 | 0.2 | 0.2 | 0.2 |
|  | Butyl stearate/part | 2.0 | 2.0 | 2.0 | 2.0 | 2.0 | 2.0 | 2.0 | 5.0 |
| Non-magnetic layer forming composition | Stearic acid/part | 2.0 | 2.0 | 2.0 | 2.0 | 2.0 | 2.0 | 2.0 | 2.0 |
|  | Stearic acid amide/part | 0.2 | 0.2 | 0.2 | 0.2 | 0.2 | 0.2 | 0.2 | 0.2 |
|  | Butyl stearate/part | 2.0 | 2.0 | 2.0 | 2.0 | 2.0 | 2.0 | 2.0 | 5.0 |
| Surface temperature of calender roll | ° C. | 100 | 100 | 100 | 100 | 100 | 105 | 100 | 100 |
| Magnetic layer surface Ra | nm | 1.8 | 1.8 | 1.8 | 1.8 | 1.8 | 1.6 | 1.8 | 1.8 |
| Surface part C—H derived C concentration |  | 45% | 50% | 60% | 70% | 75% | 50% | 47% | 60% |
| Frequency of occurrence of signal defect (thermal asperity) | number of times/m | 0.18 | 0.09 | 0.08 | 0.05 | 0.02 | 0.11 | 0.16 | 0.09 |

When Comparative Examples 1 to 4 and Comparative Examples 5 to 9 are compared to each other, it was confirmed that the frequency of occurrence of signal defect at the time of servo signal reproducing was significantly increased in a case where the total thickness of the magnetic tape was equal to or smaller than 5.30 μm and the magnetic layer surface Ra was greater than 1.8 nm, compared to a case where the total thickness of the magnetic tape was greater than 5.30 μm (Comparative Examples 1 and 2) and the magnetic layer surface Ra was greater than 1.8 nm (Comparative Examples 3 and 4).

In contrast, in the magnetic tapes of Examples 1 to 8, although the total thickness is equal to or smaller than 5.30 μm and the magnetic layer surface Ra is equal to or smaller than 1.8 nm, the frequency of occurrence of signal defect at the time of servo signal reproducing was considerably reduced, compared to the magnetic tapes of Comparative Examples 5 to 9.

An aspect of the invention can be effective in technical fields of magnetic tapes for high-density recording.

What is claimed is:

1. A magnetic tape comprising:
   a non-magnetic support; and
   a magnetic layer including ferromagnetic powder and a binder on the non-magnetic support,
   wherein a total thickness of the magnetic tape is equal to or smaller than 5.30 μm,
   the magnetic layer includes a timing-based servo pattern,
   a center line average surface roughness Ra measured regarding a surface of the magnetic layer is equal to or smaller than 1.8 nm,
   one or more components selected from the group consisting of fatty acid and fatty acid amide are included in the magnetic layer, and
   a C—H derived C concentration calculated from a C—H peak area ratio of C1s spectra obtained by X-ray photoelectron spectroscopic analysis performed on the surface of the magnetic layer at a photoelectron take-off angle of 10 degrees is equal to or greater than 45 atom %.

2. The magnetic tape according to claim 1,
   wherein the C—H derived C concentration is in a range of 45 to 80 atom %.

3. The magnetic tape according to claim 1,
   wherein the C—H derived C concentration is in a range of 50 to 80 atom %.

4. The magnetic tape according to claim 1, further comprising:
a non-magnetic layer including non-magnetic powder and a binder, between the non-magnetic support and the magnetic layer.

5. The magnetic tape according to claim 4,
wherein one or more components selected from the group consisting of fatty acid and fatty acid amide are respectively included in the magnetic layer and the non-magnetic layer.

6. The magnetic tape according to claim 1,
wherein the center line average surface roughness Ra measured regarding the surface of the magnetic layer is 1.2 nm to 1.8 nm.

7. The magnetic tape according to claim 1,
wherein the total thickness of the magnetic tape is 3.00 μm to 5.30 μm.

8. The magnetic tape according to claim 1, further comprising:
a back coating layer including non-magnetic powder and a binder on a surface of the non-magnetic support opposite to the surface including the magnetic layer.

9. A magnetic tape device comprising:
a magnetic tape;
a magnetic head; and
a servo head, wherein
the magnetic tape is a magnetic tape comprising:
a non-magnetic support; and
a magnetic layer including ferromagnetic powder and a binder on the non-magnetic support,
wherein a total thickness of the magnetic tape is equal to or smaller than 5.30 μm,
the magnetic layer includes a timing-based servo pattern,
a center line average surface roughness Ra measured regarding a surface of the magnetic layer is equal to or smaller than 1.8 nm,
one or more components selected from the group consisting of fatty acid and fatty acid amide are included in the magnetic layer, and
a C—H derived C concentration calculated from a peak area ratio of C1s spectra obtained by X-ray photoelectron spectroscopic analysis performed on the surface of the magnetic layer at a photoelectron take-off angle of 10 degrees is equal to or greater than 45 atom %.

10. The magnetic tape device according to claim 9,
wherein the C—H derived C concentration is in a range of 45 to 80 atom %.

11. The magnetic tape device according to claim 9,
wherein the C—H derived C concentration is in a range of 50 to 80 atom %.

12. The magnetic tape device according to claim 9,
wherein the magnetic tape further comprises a non-magnetic layer including non-magnetic powder and a binder, between the non-magnetic support and the magnetic layer.

13. The magnetic tape device according to claim 12,
wherein one or more components selected from the group consisting of fatty acid and fatty acid amide are respectively included in the magnetic layer and the non-magnetic layer of the magnetic tape.

14. The magnetic tape device according to claim 9,
wherein the center line average surface roughness Ra measured regarding the surface of the magnetic layer is 1.2 nm to 1.8 nm.

15. The magnetic tape device according to claim 9,
wherein the total thickness of the magnetic tape is 3.00 μm to 5.30 μm.

16. The magnetic tape device according to claim 9,
wherein the magnetic tape further comprises a back coating layer including non-magnetic powder and a binder on a surface of the non-magnetic support opposite to the surface including the magnetic layer.

* * * * *